H. MARKHAM-MILLS.
INCLINOMETER.
APPLICATION FILED FEB. 5, 1919.

1,345,098.

Patented June 29, 1920.

INVENTOR:
Herbert Markham-Mills
By Wm Wallace White
ATTY.

UNITED STATES PATENT OFFICE.

HERBERT MARKHAM-MILLS, OF WENTWORTHVILLE, NEW SOUTH WALES, AUSTRALIA.

INCLINOMETER.

1,345,098.     Specification of Letters Patent.     Patented June 29, 1920.

Application filed February 5, 1919. Serial No. 275,145.

*To all whom it may concern:*

Be it known that I, HERBERT MARKHAM-MILLS, subject of the King of Great Britain, formerly residing at No. 40 Sutherland avenue, Maida Vale, London W., 9, England, but now of Wentworthville, New South Wales, Australia, have invented new and useful Improvements in and Relating to Inclinometers, of which the following is a specification.

This invention relates to an improved inclinometer appliance whereby it will be convenient to observe or ascertain the angle of incidence of a center-line or axis of a shifting body relatively to a fixed plane.

The principal purpose of the present invention is to enable an aviator to determine the direction of flight of his aircraft, though the appliance may conveniently be employed for other akin purposes.

My purpose will be achieved by the adoption of the gyroscope to provide, during the period of the observation, a fixed plane of reference, the gyroscope wheel being maintained in rotation by electrical or other convenient means.

According to the present invention the wheel of the gyroscope is so formed that the central plane thereof is denoted by a continuous knife-edge which is maintained in rotation in proximity to a window so graduated or having an outside graduated arc adjacent thereto that the angular position of the axis of revolution can be ascertained by observation through the window.

The axle of the gyroscope is carried on centers provided in a frame which is so mounted in a surrounding casing that the plane of revolution of the wheel relatively to the casing can undergo variation with the minimum of restraint as for example by the provision of a circular ball-race with interposed balls.

The accompanying drawing shows an appliance whereby the above described invention can be performed.

In this drawing:—

Figure 1:
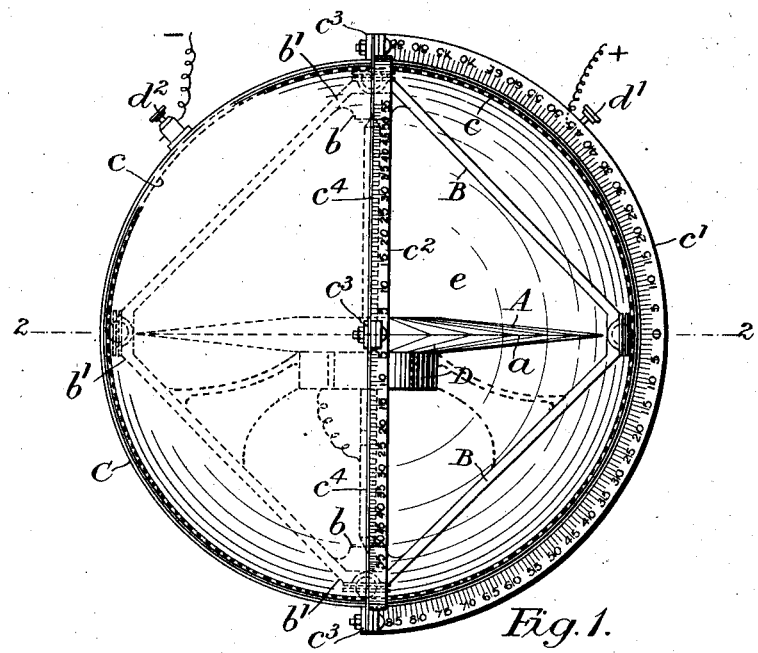
Figure 1 is an outside elevation
Figure 2:
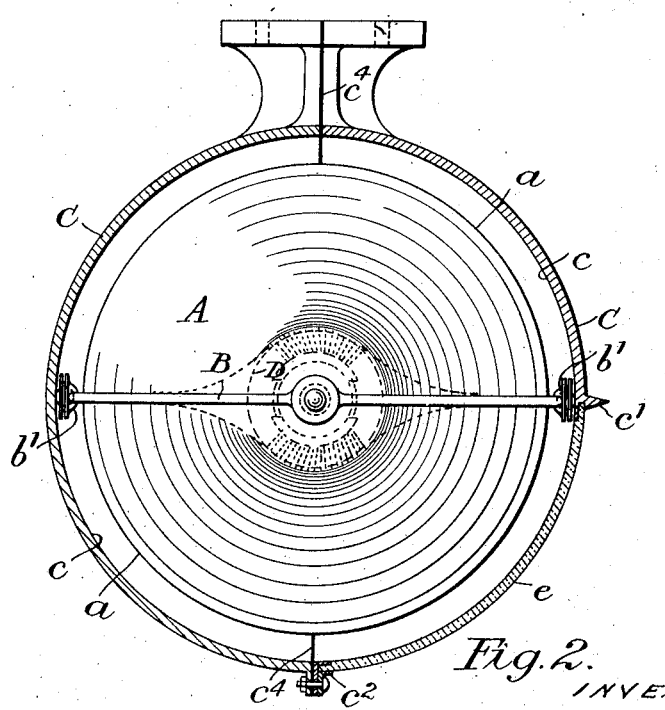
Fig. 2 is a transverse section taken through the line 2—2 of Fig. 1.

According to this drawing the wheel A of the gyroscope, formed with a knife-edged periphery $a$ is secured to an axle the coned extremities of which are carried on centers $b$ provided at the opposite corners of a frame B, the four corners $b^1$ $b^1$ of the frame being so formed as to carry balls which traverse a circular ball race $c$ formed in the interior of a spherical casing C. The said casing is partially transparent by a window $e$ of spherical conformation through which the plane of the gyroscope wheel can be viewed.

To the casing outside the window two graduated semi-circular arcs $c^1$ $c^2$ are secured at right angles to each other in proximity to the window to the interior surface of which the knife-edged periphery of the gyroscope wheel A rotates also in proximity.

D is a small motor secured to the wheel A.

The motor is supplied with electrical energy by a circuit of which $d^1$ and $d^2$ on the casing C are terminals. The two halves of the casing are interconnected by lugs or flanges $c^3$ with an insulating layer $c^4$ interposed.

The wheel A being maintained at a high speed of revolution the plane of rotation will be constant so that by watching through the window the positions of the intersection of its central plane with the graduated arcs $c^1$ $c^2$ any change on the scale $C^2$ will be that due to the change of direction of the aircraft about a lateral axis and any change on the scale $C^1$ will be that due to movement of the said lateral axis. With the aid of this information and by the use of the usual controlling arrangements of the aircraft the aviator can maintain the flight of the latter on any desired course of progress.

I claim:

An inclinometer for use in directing aircraft comprising a gyroscope, the wheel carrying frame of which is mounted on a circular ball-race provided within a spherical casing, the wheel of the gyroscope being electrically driven and formed with a knife-edged periphery and the casing having a window of spherical conformation with graduated arcs in proximity therewith whereby the angular position of the plane of revolution of the wheel can be ascertained at any instant of the flight of the aircraft.

In testimony whereof I have signed my name to this specification.

HERBERT MARKHAM-MILLS.